US012567409B2

(12) United States Patent
Sharma

(10) Patent No.: US 12,567,409 B2
(45) Date of Patent: Mar. 3, 2026

(54) RESTRICTING THIRD PARTY APPLICATION ACCESS TO AUDIO DATA CONTENT

(71) Applicant: GOOGLE LLC, Mountain View, CA (US)

(72) Inventor: Yash Sharma, Newark, CA (US)

(73) Assignee: GOOGLE LLC, Mountain View, CA (US)

( * ) Notice: Subject to any disclaimer, the term of this patent is extended or adjusted under 35 U.S.C. 154(b) by 180 days.

(21) Appl. No.: 17/942,860

(22) Filed: Sep. 12, 2022

(65) Prior Publication Data

US 2024/0087564 A1 Mar. 14, 2024

(51) Int. Cl.
| | |
|---|---|
| *G10L 15/22* | (2006.01) |
| *G06N 20/00* | (2019.01) |
| *G10L 15/06* | (2013.01) |
| *G10L 15/30* | (2013.01) |

(52) U.S. Cl.
CPC .............. *G10L 15/22* (2013.01); *G06N 20/00* (2019.01); *G10L 15/063* (2013.01); *G10L 15/30* (2013.01)

(58) Field of Classification Search
None
See application file for complete search history.

(56) References Cited

U.S. PATENT DOCUMENTS

| | | | | |
|---|---|---|---|---|
| 2006/0064759 A1* | 3/2006 | Agranat | ........... | H04N 21/63775 726/26 |
| 2016/0357987 A1 | 12/2016 | Heo | | |

| | | | |
|---|---|---|---|
| 2020/0257856 A1 | 8/2020 | Peper et al. | |
| 2021/0357496 A1 | 11/2021 | Lewis | |
| 2021/0397751 A1 | 12/2021 | Iyer | |

FOREIGN PATENT DOCUMENTS

| | | |
|---|---|---|
| JP | 2018181330 | 11/2018 |
| WO | 2019173304 | 9/2019 |
| WO | 2022173508 A1 | 8/2022 |

OTHER PUBLICATIONS

European Patent Office; International Search Report and Written Opinion issued in Application No. PCT/US2022/052203; 10 pages; dated Mar. 10, 2023.
Dan Goodin, "Alexa and Google Home abused to eavesdrop and phish passwords" Ars Technica. Retrieved from https://arstechnica.com/information-technology/2019/alexa-and-google-home-abused-tooeavesdrop-and-phish-passwords/. 9 pages, dated Oct. 20, 2019.
Japanese Patent Office, Office Action issued in Application No. 2025514814, 6 pages, dated Jul. 29, 2025.

* cited by examiner

*Primary Examiner* — Quynh H Nguyen
(74) *Attorney, Agent, or Firm* — Gray Ice Higdon

(57) ABSTRACT

Implementations relate to restricting access of an application to audio data content captured subsequent to rendering content to the user at the request of the application. An application can generate content that is to be rendered to a user with an additional request to receive audio data content from audio data captured immediately after rendering the content. The content can be processed, using a trained machine learning model that generates, as output, an indication of likelihood that providing audio data content after rendering the content from the application was improper. In instances the application improperly requested audio data content, the application can be restricted from being provided the audio data content and/or subsequent audio data content.

21 Claims, 7 Drawing Sheets

Receive content to be rendered and a request for audio data content

405

Process the content using a machine learning model to generate output

410

Determine, based on the output, that providing the audio data content is improper

415

Restrict access to audio data content

420

505

Identify content of a dialog turn that was rendered followed by providing audio data content to an application

510

Process content of the dialog turn using a machine learning model to generate output

515

Determine that the output indicates that providing the audio data content was improper

520

Restrict access to subsequent audio data content by the application

RESTRICTING THIRD PARTY APPLICATION ACCESS TO AUDIO DATA CONTENT

BACKGROUND

Humans can engage in human-to-computer dialogs with interactive software applications referred to herein as "automated assistants" (also referred to as "digital agents," "interactive personal assistants," "intelligent personal assistants," "assistant applications," "conversational agents," etc.). For example, humans (which when they interact with automated assistants may be referred to as "users") can provide commands and/or requests to an automated assistant using spoken natural language input (i.e., utterances), which may in some cases be converted into text and then processed, by providing textual (e.g., typed) natural language input, and/or through touch and/or utterance free physical movement(s) (e.g., hand gesture(s), eye gaze, facial movement, etc.). An automated assistant responds to a request by providing responsive user interface output (e.g., audible and/or visual user interface output), controlling one or more smart devices, and/or controlling one or more function(s) of a device implementing the automated assistant (e.g., controlling other application(s) of the device).

As mentioned above, many automated assistants are configured to be interacted with via spoken utterances. To preserve user privacy and/or to conserve resources, automated assistants refrain from performing one or more automated assistant functions based on all spoken utterances that are present in audio data detected via microphone(s) of a client device that implements (at least in part) the automated assistant. Rather, certain processing based on spoken utterances occurs only in response to determining certain condition(s) are present.

For example, many client devices, that include and/or interface with an automated assistant, include a hotword detection model. When microphone(s) of such a client device are not deactivated, the client device can continuously process audio data detected via the microphone(s), using the hotword detection model, to generate predicted output that indicates whether one or more hotwords (inclusive of multi-word phrases) are present, such as "Hey Assistant", "OK Assistant", and/or "Assistant". When the predicted output indicates that a hotword is present, any audio data that follows within a threshold amount of time (and optionally that is determined to include voice activity) can be processed by one or more on-device and/or remote automated assistant components such as speech recognition component(s), voice activity detection component(s), etc. The audio data predicted to contain the hotword can also be processed by other on-device and/or remote automated assistant component(s). Further, recognized text (from the speech recognition component(s)) can be processed using natural language understanding engine(s) and/or action(s) can be performed based on the natural language understanding engine output. The action(s) can include, for example, generating and providing a response and/or controlling one or more application(s) and/or smart device(s)). Other hotwords (e.g., "No", "Stop", "Cancel", "Volume Up", "Volume Down", "Next Track", "Previous Track", etc.) may be mapped to various commands, and when the predicted output indicates that one of these hotwords is present, the mapped command may be processed by the client device. However, when predicted output indicates that a hotword is not present, corresponding audio data will be discarded without any further processing, thereby conserving resources and user privacy.

An automated assistant executing at least in part on a client device can communicate with application(s) installed on the computing device and/or with application(s) that are executing on other devices (e.g., cloud-based applications or skills for the automated assistant). The application(s) can, as part of their functionality, selectively request access to audio data content of audio data that is captured by the automated assistant.

For example, an application can generate a prompt that is rendered to the user as part of a dialog between the user and the application. For instance, the dialog can be mediated by an automated assistant, the prompt provided to the automated assistant, and the automated assistant can render the prompt as part of the dialog. The application can further request access to audio data content of audio data that is captured following the prompt in a dialog with the user. For instance, if the prompt from the application is "what kind of music would you like to listen to", the application can request access to audio data content that follows the prompt so the application is able to ascertain a response of the user (e.g., a response that specifies a genre of music). The audio data content, provided to the application, can include the audio data itself, an automatic speech recognition (ASR) transcription of the audio data (e.g., generated by an ASR engine of the automated assistant), and/or a structured representation generated based on the transcription (e.g., natural language understanding (NLU) data generated by an NLU engine of the automated assistant).

However, providing unfettered access to audio data content, when requested by an application, can present various drawbacks. For example, communicating the audio data content to the application, when the audio data content is not truly needed for the dialog, can utilize bandwidth of constrained communication resources. For instance, when the application is operating on remote server(s), transmitting the audio data content can utilize network resources. As another example, communicating the audio data content to the application, when the audio data content is not truly needed for the dialog, can present security concerns for content that is inadvertently captured in the audio data content.

SUMMARY

Some implementations disclosed herein relate to determining whether to restrict access of an application to audio data content of audio data captured by a microphone during a dialog with a user, based on whether the application improperly requested access to the audio data content. Some implementations include identifying content that was generated by an application to be rendered to a user during a dialog turn, and a request from the application to be provided with audio data content corresponding to audio data captured at least subsequent to the dialog turn. The content of the dialog turn is processed utilizing one or more machine learning models trained to generate output indicative of likelihood the application properly received the audio data content (e.g., that the user should expect, subsequent to the output instance, that the microphone would be active and the client device capturing audio data, the contents of which would be provided to the application). If the output does not exceed a threshold of properness, instances of the application can be restricted from accessing the requested audio data content and/or content corresponding to subsequently captured audio data.

As an example, an application can generate content of "What is the capital of France?" to be rendered during a dialog turn in a dialog with a user. The application can request and/or otherwise cause content of audio data captured subsequent to the dialog turn to be provided (e.g., cause the microphone to be in an active state, refrain from deactivating the microphone if the microphone is already in an active state, request access to captured audio data, request content of captured audio data). In the instance of a dialog turn with content of "What is the capital of France?," a user would likely expect that immediately subsequent audio would be captured by the device and the contents of the audio data (e.g., the audio data, a textual representation of the audio data) provided to the application because the content of the dialog turn is a question that is directed to the user. Thus, in this instance, providing the audio data content to the application would likely be proper given the purpose of the dialog turn (i.e., to elicit a response).

As another example, an application can generate content of "Thanks for playing. Goodbye" to provide during a dialog turn in the dialog and further cause content of audio data captured at least subsequent to rendering the dialog turn to be provided to the application. In this instance, the dialog turn includes a signoff message and a user would not likely expect that audio data content would be provided to the application. Thus, in this instance, providing the application with audio data content subsequent to rendering the dialog turn would not likely be proper.

In some implementations, a machine learning model can be utilized to determine whether providing content of audio data, captured subsequent to content rendered during a dialog turn to a user, to an application is/was proper based on the content that was generated by the application. For example, a machine learning model can be trained using training instances that each include content of a dialog turn that was rendered to a user and was followed by captured audio data content being provided to an application. Further, each training instance can include an indication of whether providing the audio data was proper or not given the intent of the content of the corresponding dialog turn. The machine learning model can provide output that indicates a likelihood that providing audio data content was proper. For example, a trained machine learning model can provide, as output, a numerical value between 0.0 (e.g., complete confidence that providing the audio data content was proper after the dialog turn was rendered) and 1.0 (e.g., complete confidence that providing the audio data content was improper).

In some implementations, a textual representation of the content of a dialog turn that was initially provided to the user as audio may be utilized as input to the machine learning model. For example, content can be rendered, during a dialog turn, that includes "What is the capital of France?" which was generated by an application and rendered by an automated assistant in communication with the application (e.g., an automated assistant that is facilitating communication between an application and the user). The textual representation can be, for example, a transcription of what was provided, as audio, to the user, during a dialog.

In some implementations, a vector representation of content of a dialog turn can be utilized as input to a machine learning model. For example, in some implementations, processing, utilizing one or more other machine learning models, can be performed that results in a vector in an embedding space that represents the content of the content. The vector can then be provided, as input, to a machine learning model for further processing.

In some implementations, additional information can be provided as input to the machine learning model in addition to the content of a dialog turn. In some implementations, additional information can include an application type that indicates the type of application that provided the dialog turn that is being processed. In some instances, a user may expect some applications to receive contents of audio data while other applications would be less likely to have access to audio data content. Application types can indicate, for example, that an application is a quiz game, a mapping application, a rideshare application, a restaurant reservation application, and/or one or more other applications that are capable of providing dialog to a user and can cause activation of a microphone of a client device.

In some implementations, additional information can include an indication of context of the corresponding dialog turn. For example, a training instance can include an indication of whether the corresponding dialog turn was a first turn of a dialog (i.e., the first response from the application following invocation of application), a terminal turn of a dialog (i.e., the application did not provide a followup dialog turn), or whether the dialog turn was in the middle of a dialog. Also, for example, context can include information related to other dialog turns of the dialog (e.g., content from the immediately preceding, immediately subsequent, and/or content from one or more other dialog turns of the dialog).

In some implementations, additional information can include a source of the application that generated the content that was rendered during a dialog turn. For example, one or more sources of an application (e.g., an application developer, an application distributor) can be provided, with content, to the machine learning model as input. In some instances, the source of an application can be an indication of whether the application is trusted (e.g., a known developer versus an unknown or questionable developer).

In some implementations, additional information can include one or more settings of the user related to sensitivity of sharing audio data content. For example, a user can set, as part of a user account, one or more settings indicating how sensitive the user expects applications to be when receiving content of audio data.

In addition to content being provided to the machine learning model as input, training instances can include any or all of the additional information previously described as additional input to the machine learning model. For example, training instances can include a type of application that generated the corresponding content, a context for content, and/or other additional information related to the content of one or more rendered dialog turns. Further, in some implementations, training instances can be generated based on other sources of dialogs. For example, content from one or more discussion websites, such as message boards, can be utilized to generate training instances that each include a comment generated by a user and an indication of whether the comment would be one where a response was properly elicited. Indications of properness/improperness of providing a response to an application that generated content of training instances can be determined by, for example, one or more human curators reviewing the content and determining, based on assuming that the content originated from an application, whether the user would expect a response to be captured and provided to the application.

Once the machine learning model is trained, it can be utilized to process contents provided during one or more dialog turns of a target application, such as a third party application, to determine whether the target application should have access to audio data content from audio data captured by the client device(s) that are executing instances of the target application. For example, content from a plurality of dialog turns that have been provided, in response to a request from the target application to provide the content, and were followed by the application receiving audio data content can be identified and processed using the machine learning model. The output of the machine learning model can be utilized to determine likelihood that the target application was properly provided with audio data.

As an example, 1000 requests generated by a target application to provide content and to receive subsequent audio data content can be identified from logs of requests to render content by a plurality of instances of the target application. For each of the content of the rendered dialog turns, the output of the machine learning model may range from 0.0 to 1.0, as previously described. If, for example, output from processing the content of any of the 1000 requests indicates a likelihood that the corresponding request for subsequent audio data content was improper (e.g., output that exceeds a threshold value), the target application can be flagged for manual review and/or instances of the target application can be restricted from access to subsequent audio data content (e.g., audio data content not being provided, audio data content provided but a user more prominently alerted of the transmission), either permanently or until a further manual review is conducted. Also, for example, if the generated output from a threshold number of the requests (e.g., content from more than 10 of the 1000 processed requests) exceeds a threshold, the target application can be flagged for further manual review and/or instances of the application can be restricted accessing subsequent audio data content, including uninstalling and/or disabling the application.

In some implementations, requests can be from multiple client devices, each executing an instance of a target application. For example, logs from multiple devices that have executed instances of an application can be identified and the requests to render content that additionally include a request to be provided with subsequent audio data content can be utilized to determine if any of the instances of the application improperly access to subsequent audio data. In some implementations, content from one or more dialog turns can be processed at the time it is rendered (or before rendering) such that improper requests for audio data content can be identified when the audio data content is provided to the application (or before it occurs). For example, for each dialog turn of an application that was rendered followed by the application being provided with audio data content, the content of the dialog turn can be processed using the trained machine learning model to determine whether providing the audio data was proper. Also, for example, for each request to render content as a dialog turn that is accompanied by a request for subsequent audio data content, the content can be processed before being rendered to determine if the request for subsequent audio data content is proper. In either case, when output from the machine learning model indicates that providing the application with audio data content is/was improper, the application can be restricted from further access to audio data and/or restricted from providing further content to the user.

Accordingly, methods described herein can mitigate the need to process audio data content unnecessarily by preventing the audio data content to be provided for processing in instances when providing the audio data content is improper. Further, computing resources and/or network usage is reduced by not transmitting audio data and/or audio data content when improper and/or when the audio data content that is transmitted is subsequently not utilized. Still further, security can be improved by mitigating transmission of audio data content when a user is not expecting the content to be provided to one or more applications. By determining in advance of providing audio data content that the providing would be improper, given the content of a dialog turn that was rendered to the user, personal information that may be included in the audio data content can remain secure and inaccessible to third parties when unneeded.

The above description is provided as an overview of only some implementations disclosed herein. Those implementations, and other implementations, are described in additional detail herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
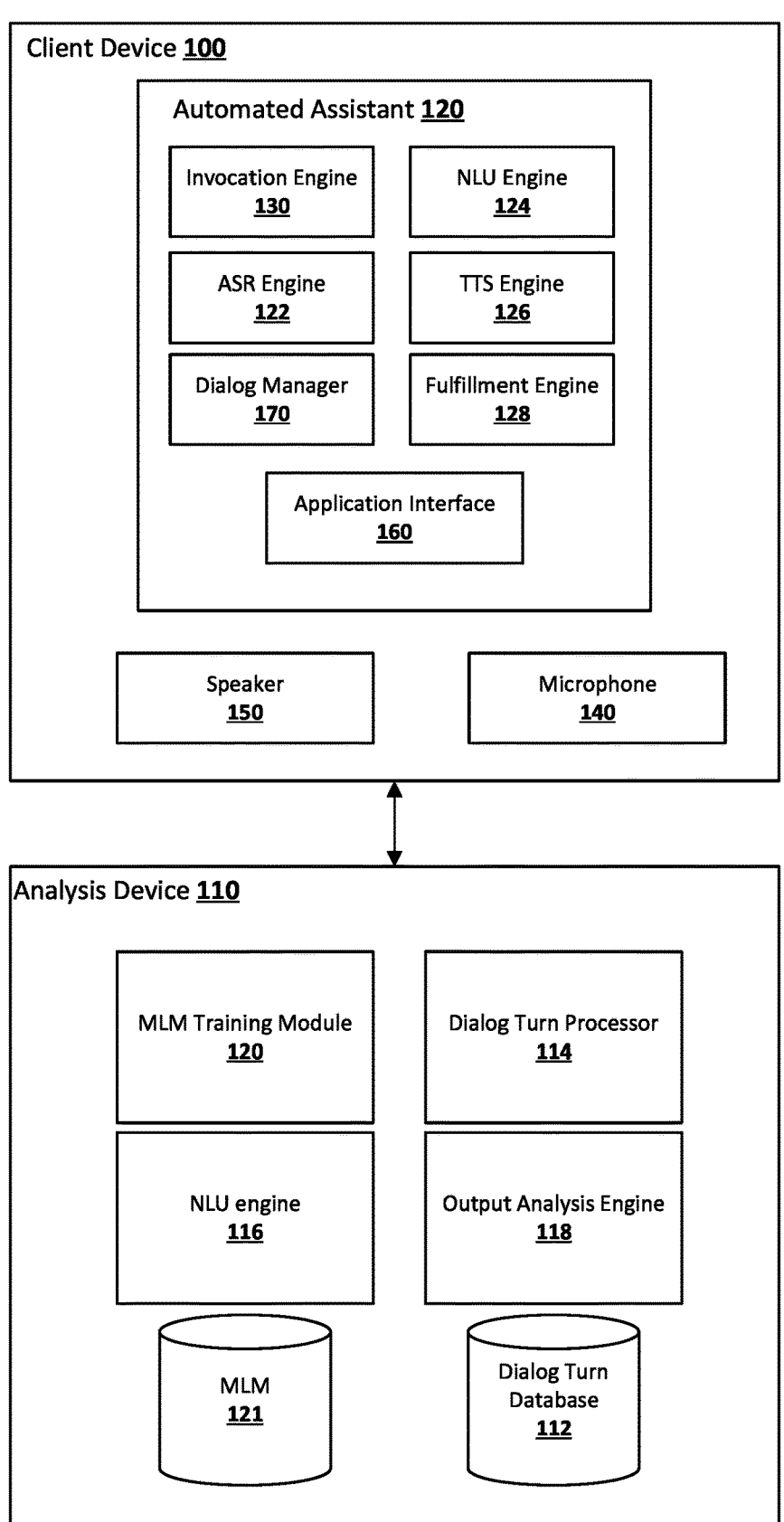
FIG. 1 is an illustration of an example environment in which implementations disclosed herein can be implemented.

Turning initially to FIG. 1, an example environment is illustrated in which various implementations can be performed. FIG. 1 includes a client device 100 executing an automated assistant which executes an instance of an automated assistant client 120. One or more cloud-based automated assistant components can be implemented on one or more computing systems (collectively referred to as a "cloud" computing system) that are communicatively coupled to client device 100 via one or more local and/or wide area networks (e.g., the Internet). An instance of an automated assistant client 120, optionally via interaction(s) with one or more of the cloud-based automated assistant components, can form what appears to be, from the user's perspective, a logical instance of an automated assistant with which the user may engage in a human-to-computer dialog.

The client device 100 can be, for example: a desktop computing device, a laptop computing device, a tablet computing device, a mobile phone computing device, a computing device of a vehicle (e.g., an in-vehicle communications system, an in-vehicle entertainment system, an in-vehicle navigation system), a standalone interactive speaker, a smart appliance such as a smart television, and/or a wearable apparatus that includes a computing device (e.g., a watch having a computing device, glasses having a computing device, a virtual or augmented reality computing device).

Automated assistant 120 engages in human-to-computer dialog sessions with a user via user interface input and output devices of the client device 100. To preserve user privacy and/or to conserve resources, in many situations a user must often explicitly invoke the automated assistant 120 before the automated assistant will fully process a spoken utterance. The explicit invocation of the automated assistant 120 can occur in response to certain user interface input received at the assistant device 100. For example, user interface inputs that can invoke the automated assistant 120 via the client device 100 can optionally include actuations of a hardware and/or virtual button of the client device 100. Moreover, the automated assistant client can include one or more local engines, such as an invocation engine 130 that is operable to detect the presence of one or more spoken general invocation wakewords. The invocation engine 130 can invoke the automated assistant 120 in response to detection of one of the spoken invocation wakewords. For example, the invocation engine 130 can invoke the automated assistant 100 in response to detecting a spoken invocation wakeword such as "Hey Assistant," "OK Assistant", and/or "Assistant". The invocation engine 130 can continuously process a stream of audio data frames that are based on output from one or more microphones 140 of the client device 100, to monitor for an occurrence of a spoken invocation phrase. While monitoring for the occurrence of the spoken invocation phrase, the invocation engine 130 discards (e.g., after temporary storage in a buffer) any audio data frames that do not include the spoken invocation phrase. However, when the invocation engine 130 detects an occurrence of a spoken invocation phrase in processed audio data frames, the invocation engine can invoke the automated assistant 120. As used herein, "invoking" the automated assistant 120 can include causing one or more previously inactive functions of the automated assistant 120 to be activated. For example, invoking the automated assistant 120 can include causing one or more local engines and/or cloud-based automated assistant components to further process audio data frames based on which the invocation phrase was detected, and/or one or more following audio data frames (whereas prior to invoking no further processing of audio data frames was occurring). For instance, local and/or cloud-based components can process captured audio data using an ASR model in response to invocation of the automated assistant 120.

The automated assistant 120 in FIG. 1 is illustrated as including an automatic speech recognition (ASR) engine 122, a natural language understanding (NLU) engine 124, a text-to-speech (US) engine 126, and a fulfillment engine 128. In some implementations, one or more of the illustrated engines can be omitted (e.g., instead implemented only by cloud-based automated assistant component(s) 140) and/or additional engines can be provided (e.g., an invocation engine described above).

The ASR engine 122 can process audio data that captures a spoken utterance to generate a recognition of the spoken utterance. For example, the ASR engine 122 can process the audio data utilizing one or more ASR machine learning models to generate a prediction of recognized text that corresponds to the utterance. In some of those implementations, the ASR engine 122 can generate, for each of one or more recognized terms, a corresponding confidence measure that indicates confidence that the predicted term corresponds to the spoken utterance.

The US engine 126 can convert text to synthesized speech, and can rely on one or more speech synthesis neural network models in doing so. The US engine 126 can be utilized, for example, to convert a textual response into audio data that includes a synthesized version of the text, and the synthesized version audibly rendered via hardware speaker(s) 150 of the client device 100.

The NLU engine 124 determines semantic meaning(s) of audio and/or text converted from audio by the ASR engine, and determines assistant action(s) that correspond to those semantic meaning(s). In some implementations, the NLU engine 124 determines assistant action(s) as intent(s) and/or parameter(s) that are determined based on recognition(s) of the ASR engine 122. In some situations, the NLU engine 124 can resolve the intent(s) and/or parameter(s) based on a single utterance of a user and, in other situations, prompts can be generated based on unresolved intent(s) and/or parameter(s), those prompts rendered to the user, and user response(s) to those prompt(s) utilized by the NLU engine 124 in resolving intent(s) and/or parameter(s). In those situations, the NLU engine 124 can optionally work in concert with a dialog manager engine 170 that determines unresolved intent(s) and/or parameter(s) and/or generates corresponding prompt(s). The NLU engine 124 can utilize one or more NLU machine learning models in determining intent(s) and/or parameter(s).

The fulfillment engine 128 can cause performance of assistant action(s) that are determined by the NLU engine 124. For example, if the NLU engine 124 determines an assistant action of "turning on the kitchen lights", the fulfillment engine 128 can cause transmission of corresponding data (directly to the lights or to a remote server associated with a manufacturer of the lights) to cause the "kitchen lights" to be "turned on". As another example, if the NLU engine 124 determines an assistant action of "provide a summary of the user's meetings for today", the fulfillment engine 128 can access the user's calendar, summarize the user's meetings for the day, and cause the summary to be visually and/or audibly rendered at the client device 100.

Automated assistant 120 further includes an application interface 160 that can communicate with one or more third party applications that are executing on client device 100. The application (not shown) can provide information, via application interface 160, to the automated assistant 120 to cause the automated assistant 120 to perform one or more actions, and/or the application can be given permissions to access one or more components of the client device 100 directly. For example, in some implementations, the application can provide text to the automated assistant 120, which can then process the text utilizing one or more components (e.g., perform ASR, NLU, US). Also, for example, the application can be given permission to directly receive audio data content corresponding to audio data captured by microphone 140 and/or to provide output via speaker 150.

In some implementations, automated assistant 120 can carry on a dialog with a user via the microphone 140 and/or the speaker 150 via client device 110. For example, referring to FIG. 2, a dialog is illustrated between a user and an automated assistant 120. Before the dialog starts, invocation engine 130 can monitor audio data captured by microphone 140 to detect the presence of one or more spoken general invocation wakewords in the audio data. For example, at dialog turn 205, the user utters the phrase "OK Assistant," which can be a wakeword that indicates that the user intends to start a dialog with the automated assistant 120.

Dialog turn 205 further includes the user uttering "open the Quiz Application." Dialog manager 170 can determine an intent based on one or more techniques described herein and perform one or more actions based on the intent. For example, dialog manager 170 can determine that the intent of the user is to interact with an application called "Quiz Application" that is executing on client device 100 and/or executing on one or more other devices. In response, fulfillment engine 128 can transmit, to the application, some or all of the audio data content from audio data that is captured by microphone 140. In response, the application can provide a response (e.g., text) to automated assistant 120 via application interface 160 to provide, as audio output via speaker 150, to the user. For example, the application can provide text to automated assistant 120 of "Welcome to Quiz Application. What would you like to play?" and automated assistant 120 can process the text utilizing TTS engine 126 and subsequently render dialog turn 210 via speaker 150.

In some implementations, the application can further send, via application interface 160, an indication to automated assistant 120 that a response is expected from the provided content and to capture subsequent audio. In response, automated assistant 120 can activate microphone 140 such that subsequent audio can be captured and audio data can be generated and further processed. For example, after providing dialog turn 210, automated assistant 120 can cause microphone 140 to be active and/or refrain from deactivating the microphone 140. Audio data that is captured after dialog turn 210 can be further processed by automated assistant 120 (e.g., ASR, NLU) and one or more actions can be performed. For example, content of the captured audio data, such as a textual representation of the audio data (after ASR processing), and/or intent of the user (after NLU) can be provided to the application as audio data content.

For example, at dialog turn 215, the user utters "Let's do country capitals." In some implementations, the audio data that includes the utterance can be provided to the application for further processing. In some implementations, automated assistant 120 can first perform ASR to generate text of "let's do country capitals" and the text can be provided to the application as audio data content for further processing. In some implementations, automated assistant 120 can first determine intent by performing NLU and provide the intent (e.g., "QUIZ=COUNTRY CAPITALS") as audio data content to the application.

Figure 2:
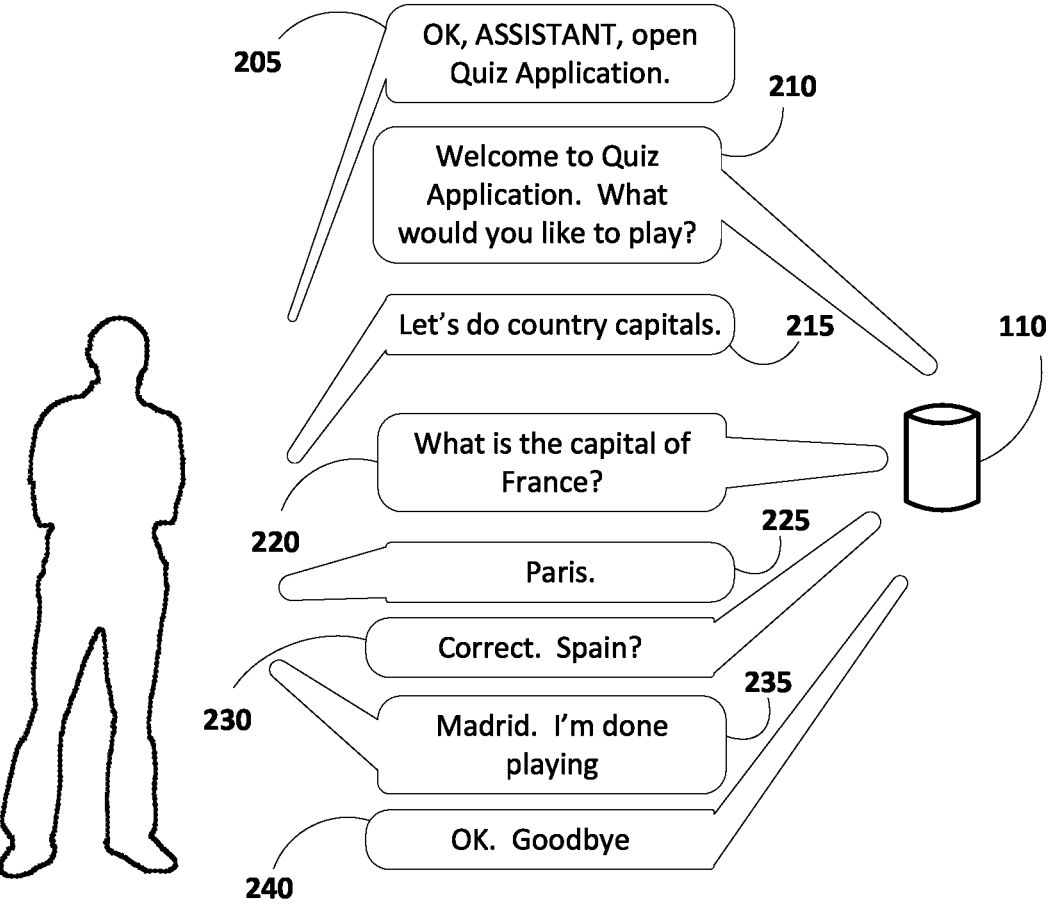
FIG. 2 illustrates a dialog between an application and a user.

The dialog can continue, as illustrated in FIG. 2, until the user indicates to stop the dialog. For example, at dialog turn 235, the user indicates "I'm done playing" as a signoff to the dialog. In response, dialog manager 170 can determine that the user intends to stop the dialog and/or the dialog turn can be provided to the application as audio data content for further processing. In some implementations, the application can determine that the dialog is complete and that subsequent audio data content should not be provided to the application. This can include, for example, providing an indication to automated assistant 120 to stop sending audio data content.

Thus, for some dialog turns that are provided to a user while interacting with application 160, the user should expect that the microphone 140 is active and capturing audio data. For example, if a dialog turn is soliciting for a response (e.g., a question), the user should expect that any subsequent audio data would be captured and provided to the application to determine whether the audio data includes a response to the question. However, for some dialog turns that are provided to a user, the user would not expect that any subsequent audio data content to be provided to an application. Because the application can be a third party application, the user may have expectations that the third party does not have access to audio data content that may include, for example, personal information that is unrelated to a dialog with the application.

Referring again to FIG. 1, the example environment further includes analysis device 110 that can determine, based on analyzing a dialog turn that includes content generated by an application and followed by audio data content being provided to the application. For example, when an application generates content that is provided during a dialog turn that is followed by subsequent audio data content being provided to the application, the content can be stored in one or more databases, such as dialog turn database 112 for subsequent processing.

In some implementations, client device 100 can provide, either as they occur or as a batch on a periodic basis, content from dialog turns that were followed by an application that generated the content being provided with subsequent audio data content. For example, the content of dialog turn 210 of FIG. 2 can be provided to analysis device 110 in real time (e.g., immediately proceeding it being rendered) or can be stored on client device 100 for a period of time and sent in a batch with, for example, the other dialog turns of the dialog (and/or with turns from other dialogs) illustrated in FIG. 2. In some implementations, content from dialog turns that were provided by other client devices in addition to client device 100 can be stored with content of the dialog turns rendered by client device 100 in dialog turn database 112.

Figure 3:
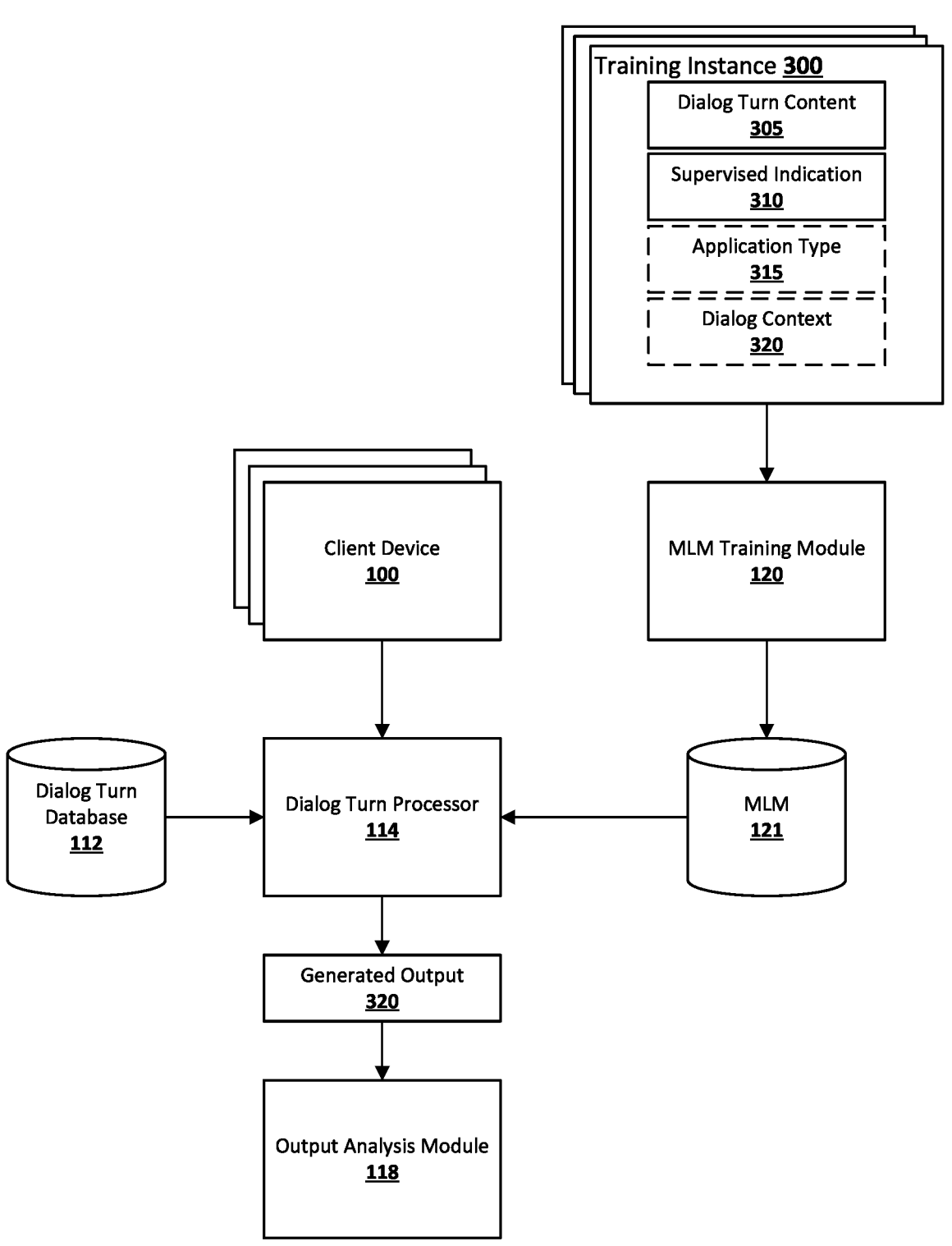
FIG. 3 is a flowchart illustrating training of a machine learning model and utilization of the trained machine learning model to process one or more dialog turns provided by an application.

Dialog turn processor 114 can receive content of a dialog turn and process the content to determine whether providing audio data content subsequent to rendering the dialog turn was proper. For example, referring to FIG. 3, a flowchart is provided that illustrates processing content of one or more dialog turns. As illustrated, dialog turn processor 114 can receive a dialog turn content from one or more client devices 100 and/or can identify dialog turn content from dialog turn database 112. In some implementations, dialog turn content can be stored and/or provided with additional information. For example, in some implementations, dialog turn content can be associated with an application type that indicates a category of application that provided the content of the dialog turn (e.g., quiz application, rideshare application, restaurant reservation application). An application type can be utilized for further processing of the dialog turn, as described herein in greater detail. Also, for example, in some implementations, dialog turn content can be provided with contextual information regarding the dialog to to which the dialog turn was a part (e.g., whether the dialog turn was rendered at the start, end, or middle of the dialog, information regarding content of other dialog turns of the corresponding dialog).

In some implementations, dialog turn content can be provided to dialog turn processor 114 and/or stored in dialog turn database 112 as a textual representation of the synthesized speech that was provided to the user during a dialog. For example, in some implementations, an application can generate text to provide to the user, as dialog turn content, during a dialog and automated assistant 120 can generate synthesized speech, utilizing TTS engine 126, to provide to the user. In some implementations, dialog turn content can include an intent of the synthesized speech that was provided to the user as part of a dialog. For example, natural language understanding can be performed on a textual representation of content of a dialog turn utilizing one or more machine learning models that generate, as output, an intent of the content. In some implementations, dialog turn content can include a vector representation of the content, such as, generating a vector using Word2vec and/or one or more other models to generate a vector that is embedded in a semantic embedding space.

In some implementations, a machine learning model (MLM) 121 can be utilized to determine whether providing audio data content captured subsequent to rendering a given dialog turn was proper. For example, machine learning model 121 can receive, as input, content of a dialog turn and optionally additional information, such as a type of application that generated the content and/or context regarding the dialog, as previously described. The machine learning model 121 can generate, as output, an indication of whether it was proper for the application that generated the content to be provided with subsequent audio data content. For example, the machine learning model 121 can generate a numerical value between 0.0 and 1.0 indicating whether providing audio data content was improper, with 0.0 indicating with complete certainty that providing the audio data content was proper and 1.0 indicating with complete certainty that providing the audio data content was improper (or vice versa, depending on how the model was trained).

In some implementations, the machine learning model 121 can receive, as input, dialog turn content that includes a textual representation of what was provided to the user in a dialog. For example, referring again to FIG. 3, dialog turn processor 114 can receive a text of content of a dialog turn from client device 100 and/or identify the text in dialog turn database 112, and process the text by providing it as input to machine learning model 121. The resulting generated output 320 can be provided to output analysis module 118 for analysis to determine whether to restrict the application that generated the content from being provided with audio data content generated from audio captured in subsequent interactions of the user with the application. In some implementations, machine learning model 121 can be provided, as dialog turn content, an intent of a dialog turn that was provided to a user by automated assistant 120. In some implementations, as previously described, client device 100 can provide, as dialog turn content, a vector embedded in a semantic embedding space that is representative of what was rendered to the user. Machine learning model 121 can generate, as output, generated output 320 that can be further analyzed by output analysis module 118. In some implementations, dialog turn processor 114 can receive and/or identify dialog turn content that is in the form of text, perform natural language processing on the text first, and provide the output of the natural language processing as input to the machine learning model 121. Thus, in implementations where the machine learning model 121 receives a vector as input, text can be processed using natural language processing to generate vector by one or more other components and/or the text may be processed by the dialog turn processor 114 prior to additional processing utilizing the machine learning model 121.

A machine learning model 121 can be trained with one more training instances that, when processed, refine the generated output of the machine learning model 121. As an example, referring to FIG. 3, training instances 300 each include dialog turn content 305, which can include the content that was generated by an application and was provided to a user via a dialog turn. Each training instance 300 further includes a supervised indication 310 that was determined by curation of the dialog turn content 305. For example, a human can review content and determine, based on the content, whether providing subsequent audio data content would be proper. The curator can assign a value (e.g., yes for proper, 0 for improper, or vice versa) to indicate whether, if the dialog turn content 305 were provided in a dialog, providing subsequent audio data content would be proper. In some implementations, the training instances 300 can be generated from content that was previously provided as part of a dialog (e.g., content from dialog turn database 112 or other sources of generated content). In some implementations, one or more other sources of content can be utilized to determine dialog turn content 305 for training instances 300. For example, a messaging application and/or a discussion board website can be utilized to identify content that could be provided to a user in a dialog and one or more curators can determine, based on the content, a supervised indication 310 to assign to the training instance 300. Optionally, training instances can include an application type 315, indicating the type of application that generated the dialog turn content. Also optionally, a training instance 300 can include a dialog context 320 that indicates additional information regarding the dialog that included the dialog turn content 305. For example, dialog context 320 can include content from one or more other dialog turns of the dialog, the position of the dialog turn in the dialog, and/or other information of the dialog that is beyond the content that was rendered in the dialog turn.

Output analysis module 118 can determine, based on the generated output 320, whether to restrict access, by an application, to audio data content generated from captured audio data. As previously described, generated output 320 can be a numerical value between, for example, 0.0 (complete confidence that previously providing audio data to application 160 was proper) and 1.0 (complete confidence that providing the audio data was improper). Output analysis module 118 can determine, based on processing output generated by machine learning model 121, whether the application, when requesting content be rendered as a dialog turn, improperly requested access to audio data content generated from audio data captured at least subsequent to the rendering of the content. If output analysis module 118 determines that the application requesting audio data content was improper, the application can be immediately restricted from subsequently accessing audio data, the application can be flagged for manual review, and/or one or more other actions can be performed to otherwise prevent the application from continuing to improperly receive audio data.

In some implementations, generated output 320 can be utilized to determine whether to increase scrutiny of subsequent requests by an application to access audio data content of audio data captured in response to rendering content. For example, if the generated output exceeds a threshold of improperness, subsequent interactions with the application can be accompanied by an indication, rendered to the user, indicating that the application is receiving audio data content. The indication can be, for example, a visual indication that indicates that the microphone is active and audio data is being processed, a message that is provided to the user while the user is interacting with the application, an audio cue that alerts the user that the application may be processing audio data, and/or one or more other indications that indicate, more prominently than an indication that may be present with other applications, that the application may be processing audio data content.

In some implementations, if the generated output 320 satisfies a threshold of improperness, the application can be restricted from access to the audio data content and/or access to subsequent audio data content. For example, the automated assistant 120, before providing the application with the audio data content, can first provide the rendered content (and optionally, additional information, as described herein), to dialog turn processor 114 for processing. If the generated output 320 satisfies a threshold of properness (or does not satisfy a threshold of improperness), the application can be provided with the audio data content. However, if the generated output 320 indicates that providing audio data content after rendering the content was improper, the audio data content may not be transmitted to the application.

In some implementations, content from multiple dialog turns that were each followed by an application that generated the content being provided with audio data content can be identified and the content from each of the identified dialog turns can be processed utilizing dialog turn processor 114. For example, dialog turn database 112 can include content from a plurality of dialog turns (either from a single dialog or from multiple dialogs, generated from a single instance of the application or from multiple instances of the application). In some implementations, if generated output 320 from one or more of the processed contents exceeds a threshold, the application can be restricted from subsequent audio data content. For example, if generated output 320 is above a threshold of 0.7 of improperness, the request for audio data content can be considered improper and the application can be restricted. Also, for example, applications can be restricted from subsequent audio data content in more than one manner and generated output 320 can be checked to determine whether it satisfies multiple thresholds, each with a different manner of restriction. For example, applications that generated content that was improper with generated output 320 of 0.7 can be completely blocked from being provided subsequent audio data content, whereas applications that generated content that was improper with generated output 320 of 0.4 may be restricted by having a higher alert level to the user associated with subsequent instances of providing audio data content. Other examples of restricting subsequent audio data content from being provided to an application can include uninstalling the application and/or instances of the application, alerting the user to the instance whereby audio data content was improperly provided, and/or flagging the application for further manual review.

Figure 4:
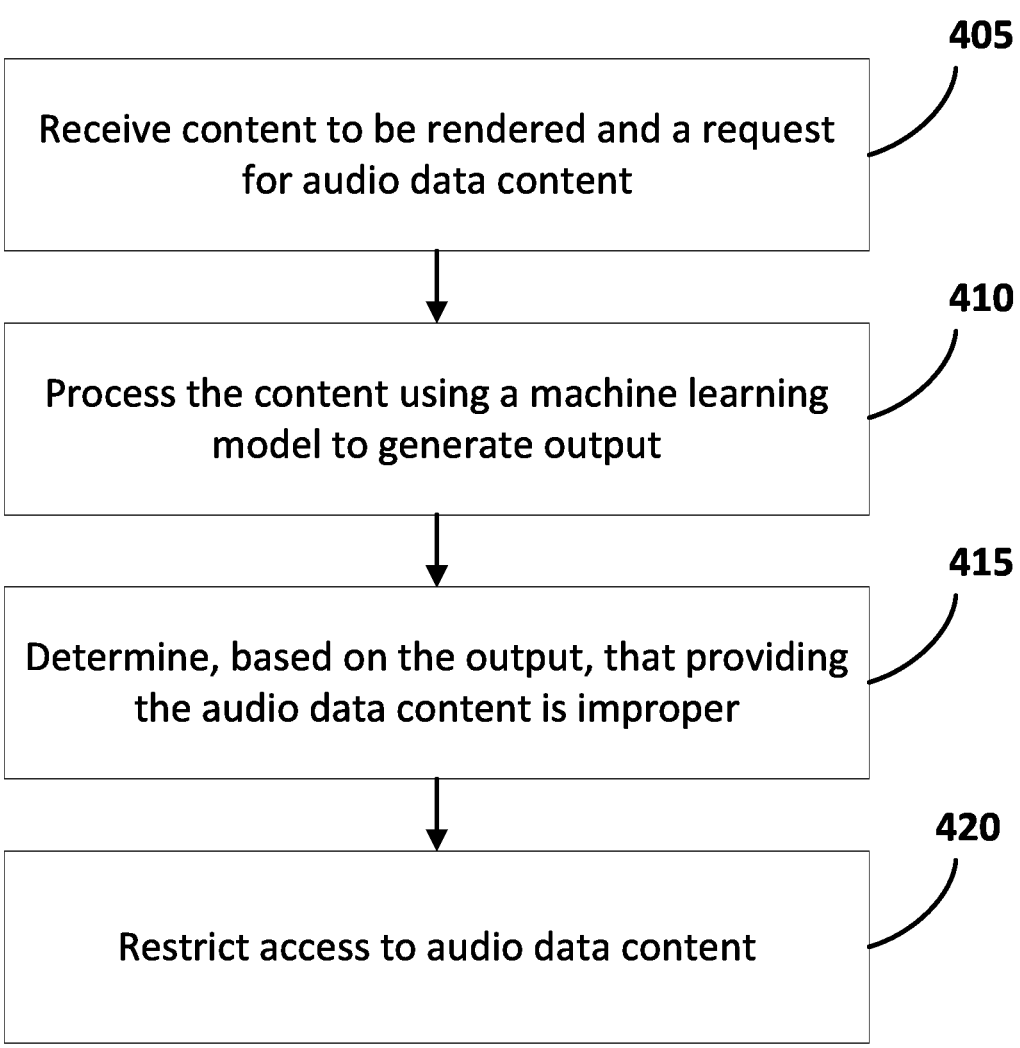
FIG. 4 is a flowchart illustrating an example method according to various implementations disclosed herein.

FIG. 4 depicts a flowchart illustrating an example method of processing dialog turn content using a trained machine learning model. For convenience, the operations of the method are described with reference to a system that performs the operations, such as the system illustrated in FIG. 1. This system of method includes one or more processors and/or other component(s) of a client device. Moreover, while operations of the method are shown in a particular order, this is not meant to be limiting. One or more operations may be reordered, omitted, or added.

At step 405, content to be rendered and a request for subsequent audio data content is received from an application. The content and the request can be received by a component that shares one or more characteristics with automated assistant 120 of FIG. 1. For example, automated assistant 120 can receive, via application interface 160, a request that content, also received with the request, be rendered to a user in a dialog. Further, the application can request, via application interface 160, to be provided with audio data content from audio data captured at least subsequent rendering the content.

At step 410, the content is processed using a trained machine learning model to generate output. The machine learning model can share one or more characteristics with machine learning model 121 of FIG. 1. In some implementations, a component that shares one or more characteristics with dialog turn processor 114 can provide to machine learning model 121, as input, the content that was received at step 405. In some implementations, the content can be provided as input to the machine learning model 121 with additional information. For example, content can be provided to machine learning model along with a type indicating a category of application that provided the content, contextual information related to the dialog with the user (e.g., where in the dialog the dialog turn occurs), and/or other additional information. The content can be provided as, for example, textual data, a vector generated via natural language processing, and/or an intent of the content. In some implementations, automated assistant 120 can process the content before rendering the content in a dialog turn. In some implementations, automated assistant 120 can provide the content first and process the content afterwards but before providing subsequent audio data content to the application.

At step 415, providing the output is determined to be improper based on the generated output from the machine learning model. In some implementations, the machine learning model can provide, as generated output, a value indicating the likelihood that providing subsequent audio data content was proper, given the content generated by the application. For example, generated output can indicate that providing audio data content after given content is rendered is 0.7, indicating a 70% likelihood that providing is improper. If the value exceeds a threshold, at step 420, the application is restricted from access to the audio data content.

Figure 5:
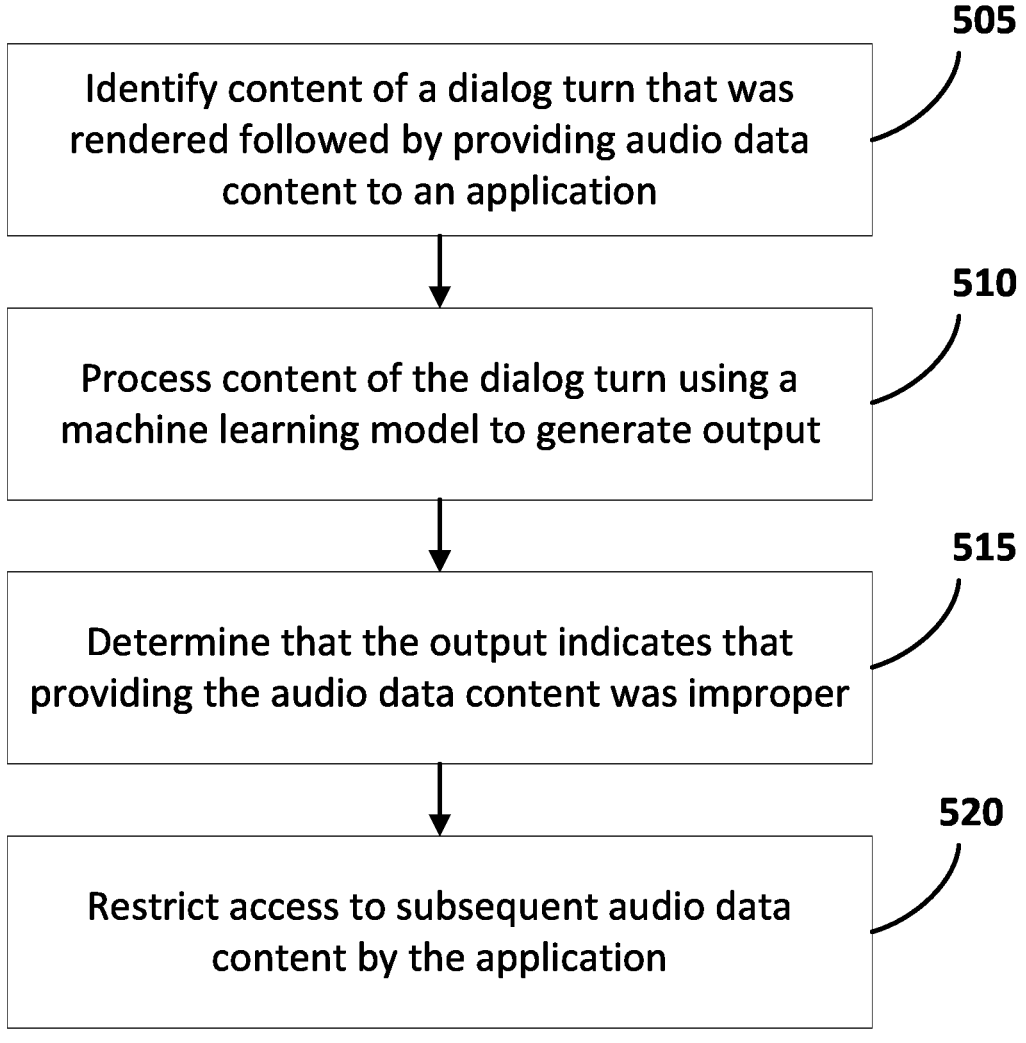
FIG. 5 is a flowchart illustrating another example method according to various implementations disclosed herein.

FIG. 5 depicts a flowchart illustrating an example method of processing dialog turn content using a trained machine learning model. For convenience, the operations of the method are described with reference to a system that performs the operations, such as the system illustrated in FIG. 1. This system of method includes one or more processors and/or other component(s) of a client device. Moreover, while operations of the method are shown in a particular order, this is not meant to be limiting. One or more operations may be reordered, omitted, or added.

At step 505, a dialog turn content that was rendered, to a user, and followed by the application that generated the content being provided with audio data content is identified. The dialog turn content can be identified by a component that shares one or more characteristics with dialog turn processor 114. In some implementations, the dialog turn content can be identified in a database that stores content that was generated by one or more applications, such as dialog turn database 112. In some implementations client device 100 can provide content from a rendered dialog turn. The dialog turn content can be provided with additional information, such as described herein, including with reference to step 405 of FIG. 4.

At step 510, the content is processed, using a machine learning model, to generate output that indicates likelihood that providing the audio data content was proper. The processing of the dialog turn content can share one or more characteristics with step 410. For example, content from a dialog turn can be processed and the generated output can be indicative of likelihood that providing audio data content subsequent to an application was improper.

At step 515, providing the audio data content to the application is determined to be improper. Step 515 can share one or more characteristics with step 415 of FIG. 4. For example, generated output from processing a given dialog turn can be compared to a threshold and, in the case that the generated output exceeds a threshold, providing the audio data content can be determined to be improper. Thus, for processed dialog turns, 10 resulting generated outputs can be utilized to determine, for example, how many of the contents, when rendered, resulted in improper providing of audio data content. If, for example, a threshold number of the processed dialog turns are determined to be improper, at step 520, the application is restricted from accessing subsequent audio data content.

Figure 6:
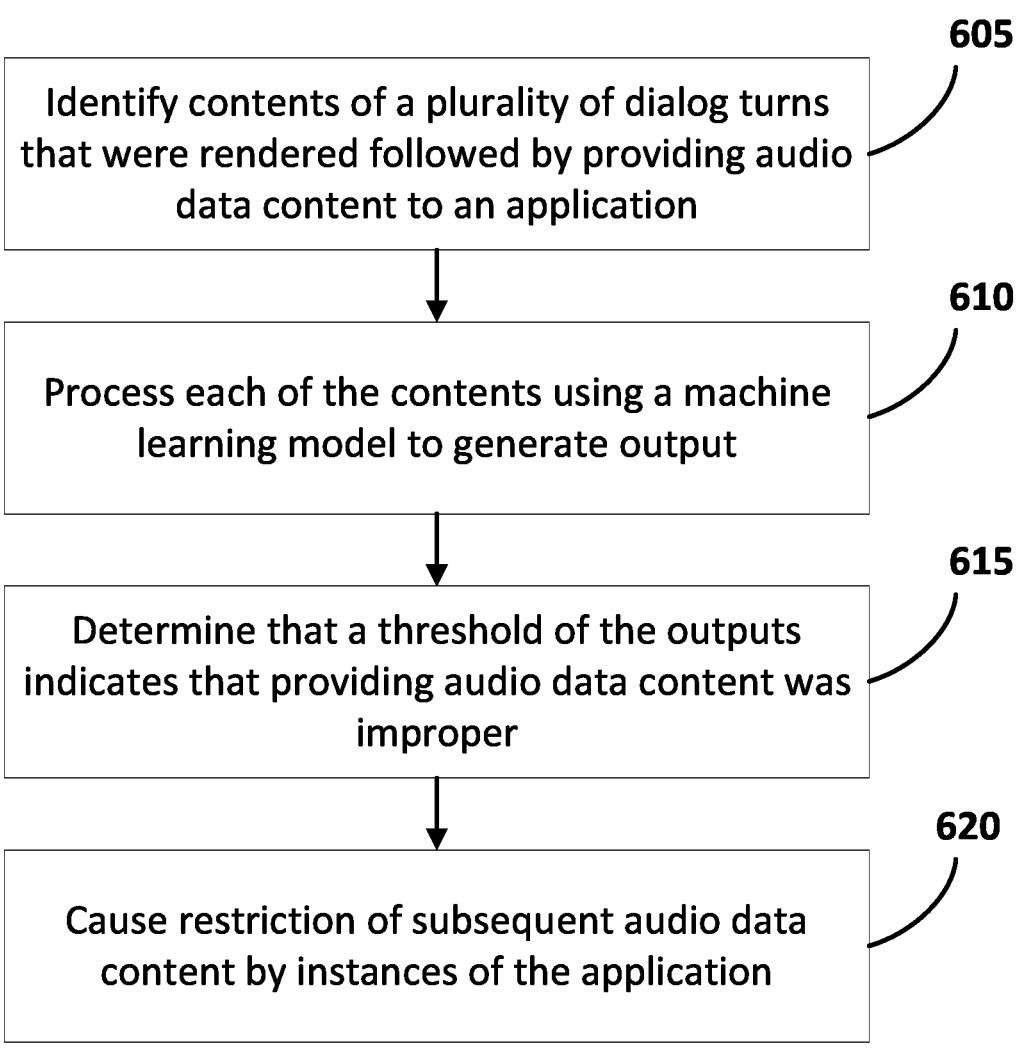
FIG. 6 is a flowchart illustrating another example method according to various implementations disclosed herein.

FIG. 6 depicts a flowchart illustrating an example method of processing dialog turn content using a trained machine learning model. For convenience, the operations of the method are described with reference to a system that performs the operations, such as the system illustrated in FIG. 1. This system of the method includes one or more processors and/or other component(s) of a client device. Moreover, while operations of the method are shown in a particular order, this is not meant to be limiting. One or more operations may be reordered, omitted, or added.

At step 605, contents of a plurality of dialog turns that were rendered to the user and followed by the application that generated the contents being provided with audio data content are identified. The contents of the dialog turn can be identified by a component that shares one or more characteristics with dialog turn processor 114. In some implementations, the dialog turn contents can be identified in a database that stores content that was generated by one or more applications, such as dialog turn database 112. In some implementations client device 100 can provide content from a plurality of rendered dialog turns. The dialog turn content can be provided with additional information, such as described herein, including with reference to step 405 of FIG. 4 and 505 of FIG. 5.

At step 610, each of the contents is processed, using a machine learning model, to generate output for each dialog turn content. The processing of the dialog turn content can share one or more characteristics with step 410 and/or step 510. For example, content from a dialog turn can be processed and the generated output can be indicative of likelihood that providing audio data content subsequent to an application was improper. Each dialog turn can be processed in this manner such that, for each dialog turn content that is processed, a corresponding output is generated.

At step 615, the generated output is utilized to determine that a threshold of the outputs indicates that providing audio data output to the application was improper. Step 615 can share one or more characteristics with step 415 of FIG. 4 and/or step 515 of FIG. 5. For example, generated output from processing a given dialog turn can be compared to a threshold and, in the case that the generated output exceeds a threshold, providing the audio data content can be determined to be improper. Thus, for 10 processed dialog turns, 10 resulting generated outputs can be utilized to determine, for example, how many of the contents, when rendered, resulted in improper providing of audio data content. If, for example, a threshold number of the processed dialog turns are determined to be improper, at step 520, the application is restricted from accessing subsequent audio data content.

Figure 7:
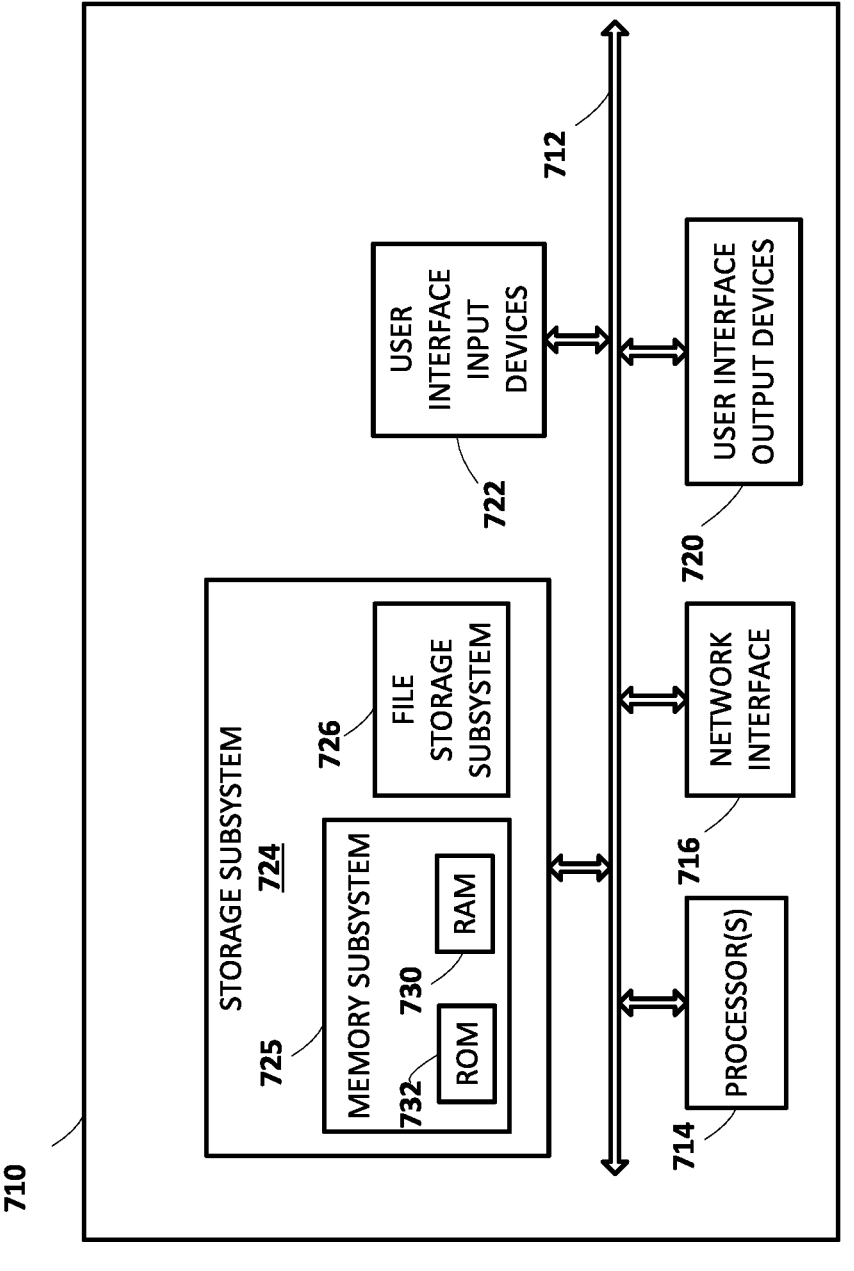
FIG. 7 illustrates an example architecture of a computing device.

FIG. 7 is a block diagram of an example computing device 710 that may optionally be utilized to perform one or more aspects of techniques described herein. Computing device 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computing device 710. Network interface subsystem 716 provides an interface to outside networks and is coupled to corresponding interface devices in other computing devices.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 710 to the user or to another machine or computing device.

Storage subsystem 724 stores programming and data constructs that provide the functionality of some or all of the modules described herein. For example, the storage subsystem 724 may include the logic to perform selected aspects of the method of FIGS. 4-6, and/or to implement various components depicted in FIG. 1 and FIG. 3.

These software modules are generally executed by processor 714 alone or in combination with other processors. Memory 725 used in the storage subsystem 724 can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computing device 710 communicate with each other as intended. Although bus subsystem 712 is shown schematically as a single bus, alternative implementations of the bus subsystem may use multiple busses.

Computing device 710 can be of varying types including a workstation, server, computing cluster, blade server, server farm, or any other data processing system or computing device. Due to the ever-changing nature of computers and networks, the description of computing device 710 depicted in FIG. 7 is intended only as a specific example for purposes of illustrating some implementations. Many other configurations of computing device 710 are possible having more or fewer components than the computing device depicted in FIG. 7.

Implementations disclosed herein include a method, comprising: during a dialog session that is occurring via a client device, that is between a user and an application, and that is mediated by an automated assistant: receiving, by the automated assistant and from the application: content to be rendered, by the automated assistant on behalf of the application, in a dialog turn of the dialog session, and a request that the application be provided with audio data content corresponding to audio data captured by a microphone of the client device during and/or after rendering of the content in the dialog turn. The method further includes processing the content, using a trained machine learning model, to generate output that is based on the content and that indicates whether providing the audio data content to the application is proper. In response to determining that providing the audio data content is improper, the method includes restricting access, by the application, to the audio data content.

These and other implementations of the technology disclosed herein can include one or more of the following features.

In some implementations, processing the content is performed by one or more other computing devices that are in addition to the client device.

In some implementations, determining that providing audio data is improper includes determining that the output does not satisfy a threshold of properness. In some of those implementations, the method further includes selecting the threshold of properness, from a plurality of candidate thresholds of properness, based on one or more attributes of the application. In some of those implementations, the one or more attributes of the application, based on which the threshold of properness is selected, include a type of the application. In other of those implementations, the method further includes selecting the threshold of properness, from a plurality of candidate thresholds of properness, based on a data security level previously specified for the client device and/or for the user.

In some implementations, restricting the audio data includes disabling the application.

In some implementations, prior to the dialog session, the method includes training the machine learning model using supervised training instances that each include: corresponding content rendered during a corresponding previous dialog turn with a corresponding user, and a corresponding supervised indication of whether providing audio data content, responsive to rendering of the corresponding content, would be proper.

Other implementations disclosed herein include a method, including: identifying content of a dialog turn based on the content being rendered during the dialog turn and based on an application that generated the content receiving audio data content corresponding to audio data captured, by a microphone of a rendering client device, at least subsequent to the content being rendered in the dialog turn; processing the content of the dialog turn, using a machine learning model, to generate output that is based on the content and that indicates whether providing the audio data content to the application was proper; and in response to determining that the generated output indicates that providing the audio data content to the application was improper: restricting access to subsequent audio data content corresponding to subsequent audio data by one or more application instances of the target application.

These and other implementations of the technology disclosed herein can include one or more of the following features.

In some implementations, processing the content of the dialog turn includes determining an application type for the target application, and providing, as input to the machine learning model, the application type.

In some implementations, processing the content of the dialog turn includes identifying a textual representation of the content of the dialog turn; and providing, as input to the machine learning model, the textual representation of the content of the dialog turn.

In some implementations, processing the content of the dialog turn includes processing the content of the dialog turn to determine an intent of the content of the dialog turn, and providing the intent of the content of the dialog turn as input to the machine learning model. In some of those implementations, processing the content of the dialog turn includes processing the content of the dialog turn, using an additional machine learning model, to generate a vector, and providing the vector as input to the machine learning model.

In some implementations, the method further includes identifying a context for the dialog turn in the dialog and providing the context for the dialog turn as additional input to the machine learning model. In some of those implementations, the context indicates that the dialog turn is a terminal dialog turn in the dialog. In other of those implementations, the context indicates content of one or more prior and/or subsequent dialog turns of the dialog.

Still other implementations disclosed herein include a method, comprising: identifying contents of a plurality of dialog turns based on the content of each of the dialog turns being rendered during the corresponding dialog turn and followed by an instance of an application that generated the corresponding content receiving audio data content captured, as audio data, by a microphone of a corresponding rendering client device at least subsequent to the corresponding content being rendered; processing the contents of the dialog turns, using a trained machine learning model, to generate outputs based on the corresponding content and that indicates whether providing the audio data content to the application was proper; and in response to determining that a threshold of the generated outputs indicates that providing at least a portion of the audio data content to the application was improper: causing restriction of subsequent audio data content by one or more current application instances of the application.

These and other implementations of the technology disclosed herein can include one or more of the following features.

In some implementations, a given generated output indicates that providing the corresponding audio data content to the application was improper if the given generated output exceeds a threshold.

In some implementations, the plurality of dialog turns were part of a single dialog.

In some implementations, the plurality of dialog turns were provided by a single instance of the target application of the one or more instances of the target application.

In some implementations, the method further includes identifying an application type for the target application; and determining the threshold of the generated outputs based on the application type.

In some implementations, the method further includes identifying a third party that is associated with the application and determining the threshold of the generated outputs based on the third party.

In situations in which certain implementations discussed herein may collect or use personal information about users (e.g., user data extracted from other electronic communications, information about a user's social network, a user's location, a user's time, a user's biometric information, and a user's activities and demographic information, relationships between users, etc.), users are provided with one or more opportunities to control whether information is collected, whether the personal information is stored, whether the personal information is used, and how the information is collected about the user, stored and used. That is, the systems and methods discussed herein collect, store and/or use user personal information only upon receiving explicit authorization from the relevant users to do so.

For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

The invention claimed is:

1. A method of improving security of audio data content, implemented by one or more processors, comprising:
prior to a dialog session:
training a machine learning model using supervised training instances that each include:
corresponding content rendered during a corresponding previous dialog turn with a corresponding user, and
a corresponding supervised indication of whether providing audio data content, responsive to rendering of the corresponding content, would be proper;
during the dialog session that is occurring via a client device, that is between a user and an application, and that is mediated by an automated assistant:
receiving, by the automated assistant and from the application:

content to be rendered, by the automated assistant on behalf of the application, in a dialog turn of the dialog session, and
a request that the application be provided with audio data content corresponding to audio data captured by a microphone of the client device, wherein the audio data is captured in a first time period during which the content is rendered in the dialog turn, a second time period that begins after the content is rendered in the dialog turn, or a third time period that includes the first time period and the second time period;
processing the content, using the machine learning model, to generate output that is based on the content and that indicates whether providing the audio data content to the application is proper; and
in response to determining that providing the audio data content is improper:
restricting access, by the application, to the audio data content.

2. The method of claim 1, wherein processing the content is performed by one or more other computing devices that are in addition to the client device.

3. The method of claim 1, wherein determining that providing audio data is improper includes determining that the output does not satisfy a threshold of properness.

4. The method of claim 3, further comprising:
selecting the threshold of properness, from a plurality of candidate thresholds of properness, based on one or more attributes of the application.

5. The method of claim 4, wherein the one or more attributes of the application, based on which the threshold of properness is selected, include a type of the application.

6. The method of claim 3, further comprising:
selecting the threshold of properness, from a plurality of candidate thresholds of properness, based on a data security level previously specified for the client device and/or for the user.

7. The method of claim 1, wherein restricting the audio data includes disabling the application.

8. The method of claim 6, wherein processing the content of the dialog turn includes:
processing the content of the dialog turn, using an additional machine learning model, to generate a vector; and
providing the vector as input to the machine learning model.

9. A method of improving security of audio data content, implemented by one or more processors, comprising:
prior to a dialog session:
training a machine learning model using supervised training instances that each include:
corresponding content rendered during a corresponding previous dialog turn with a corresponding user, and
a corresponding supervised indication of whether providing audio data content, responsive to rendering of the corresponding content, would be proper;
identifying content of a dialog turn based on the content being rendered during the dialog turn and based on an application that generated the content receiving audio data content corresponding to audio data captured, by a microphone of a rendering client device, at least subsequent to the content being rendered in the dialog turn;

processing the content of the dialog turn, using the machine learning model, to generate output that is based on the content and that indicates whether providing the audio data content to the application was proper; and in response to determining that the generated output indicates that providing the audio data content to the application was improper:

restricting access to subsequent audio data content corresponding to subsequent audio data by one or more application instances of the application.

10. The method of claim 9, wherein processing the content of the dialog turn includes:

determining an application type for the application; and providing, as input to the machine learning model, the application type.

11. The method of claim 9, wherein processing the content of the dialog turn includes:

identifying a textual representation of the content of the dialog turn; and providing, as input to the machine learning model, the textual representation of the content of the dialog turn.

12. The method of claim 9, wherein processing the content of the dialog turn includes:

processing the content of the dialog turn to determine an intent of the content of the dialog turn; and providing the intent of the content of the dialog turn as input to the machine learning model.

13. The method of claim 9, further comprising:

identifying a context for the dialog turn in the dialog; and providing the context for the dialog turn as additional input to the machine learning model.

14. The method of claim 13, wherein the context indicates that the dialog turn is a terminal dialog turn in the dialog.

15. The method of claim 13, wherein the context indicates content of one or more prior and/or subsequent dialog turns of the dialog.

16. A method of improving security of audio data content, implemented by one or more processors, comprising:

prior to a dialog session:

training a machine learning model using supervised training instances that each include:

corresponding previous content rendered during a corresponding previous dialog turn with a corresponding user, and a corresponding supervised indication of whether providing audio data content, responsive to rendering of the corresponding previous content, would be proper;

identifying contents of a plurality of dialog turns based on the content of each of the dialog turns being rendered during a corresponding dialog turn and followed by an instance of an application that generated the corresponding content receiving audio data content captured, as audio data, by a microphone of a corresponding rendering client device at least subsequent to the corresponding content being rendered;

processing the contents of the dialog turns, using the machine learning model, to generate outputs based on the corresponding content and that indicates whether providing the audio data content to the application was proper; and in response to determining that a threshold of the generated outputs indicates that providing at least a portion of the audio data content to the application was improper:

causing restriction of subsequent audio data content by one or more current application instances of the application.

17. The method of claim 16, wherein a given generated output indicates that providing the corresponding audio data content to the application was improper if the given generated output exceeds a threshold.

18. The method of claim 16, wherein the plurality of dialog turns were part of a single dialog.

19. The method of claim 16, wherein the plurality of dialog turns were provided by a single instance of the application of the one or more instances of the application.

20. The method of claim 16, further comprising:

identifying an application type for the application; and determining the threshold of the generated outputs based on the application type.

21. The method of claim 16, further comprising:

identifying a third party that is associated with the application; and determining the threshold of the generated outputs based on the third party.

* * * * *